United States Patent
Fletcher et al.

(10) Patent No.: US 11,300,145 B1
(45) Date of Patent: Apr. 12, 2022

(54) PERIODIC UNSTEADINESS GENERATOR

(71) Applicant: Government of the United States as Represented by the Secretary of the Air Force, Wright-Patterson AFB, OH (US)

(72) Inventors: Nathan J Fletcher, Beavercreek, OH (US); Christopher R Marks, Waynesville, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 17/086,242

(22) Filed: Oct. 30, 2020

Related U.S. Application Data

(60) Provisional application No. 62/928,073, filed on Oct. 30, 2019.

(51) Int. Cl.
  *F15D 1/12* (2006.01)
  *F15D 1/00* (2006.01)
  *F15D 1/08* (2006.01)
  *F15D 1/06* (2006.01)

(52) U.S. Cl.
  CPC ........... *F15D 1/008* (2013.01); *F15D 1/0065* (2013.01); *F15D 1/065* (2013.01); *F15D 1/08* (2013.01); *F15D 1/12* (2013.01)

(58) Field of Classification Search
  CPC ........ F15D 1/008; F15D 1/0065; F15D 1/065; F15D 1/08; F15D 1/12
  USPC ............................ 137/13; 244/207, 208, 209
  See application file for complete search history.

(56) References Cited

U.S. PATENT DOCUMENTS

| | | | | |
|---|---|---|---|---|
| 2,885,160 | A * | 5/1959 | Griswold, II | B64C 3/141 244/207 |
| 3,262,658 | A * | 7/1966 | Reilly | B64C 23/00 244/207 |
| 4,463,920 | A * | 8/1984 | Nichols, Jr. | B64C 9/24 244/207 |
| 7,104,498 | B2 * | 9/2006 | Englar | B64C 21/04 244/12.6 |
| 8,348,199 | B2 * | 1/2013 | Sheaf | B64D 29/04 244/200.1 |
| 8,382,043 | B1 * | 2/2013 | Raghu | B64C 21/04 244/207 |
| 9,133,819 | B2 * | 9/2015 | Zuteck | F03D 1/0675 |
| 10,005,544 | B2 * | 6/2018 | Shmilovich | B64C 21/04 |
| 10,358,208 | B2 * | 7/2019 | Lin | B64C 21/08 |
| 10,526,072 | B2 * | 1/2020 | Shmilovich | B64C 9/38 |
| 2010/0276006 | A1 * | 11/2010 | Bonutti | B60C 19/00 137/13 |
| 2015/0361999 | A1 * | 12/2015 | Willie | B64D 37/005 137/13 |
| 2016/0052621 | A1 * | 2/2016 | Ireland | F04D 29/684 137/13 |

\* cited by examiner

*Primary Examiner* — Minh Q Le
(74) *Attorney, Agent, or Firm* — AFMCLO/JAZ; Jeffrey R Moore

(57) ABSTRACT

The systems and methods provided herein are directed to a stationary device for simulating the periodic unsteadiness typically produced by turbines in an air stream. A streamlined body includes a line of jets along its leading edge that pulses air at an angle against the air stream, and a separate line of jets along its trailing edge to expel a sustained air flow in the same direction as the air stream.

2 Claims, 6 Drawing Sheets

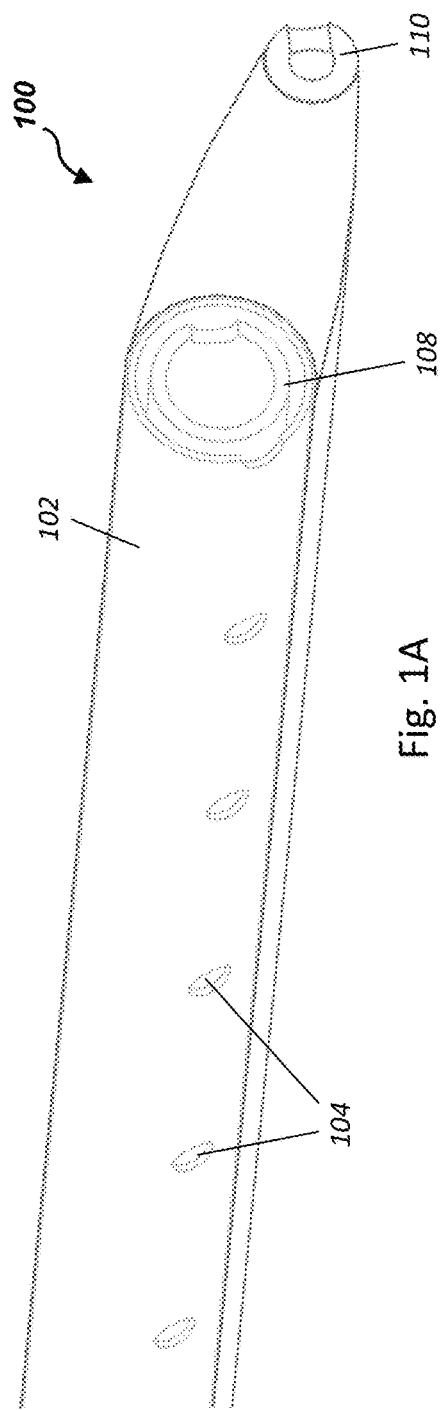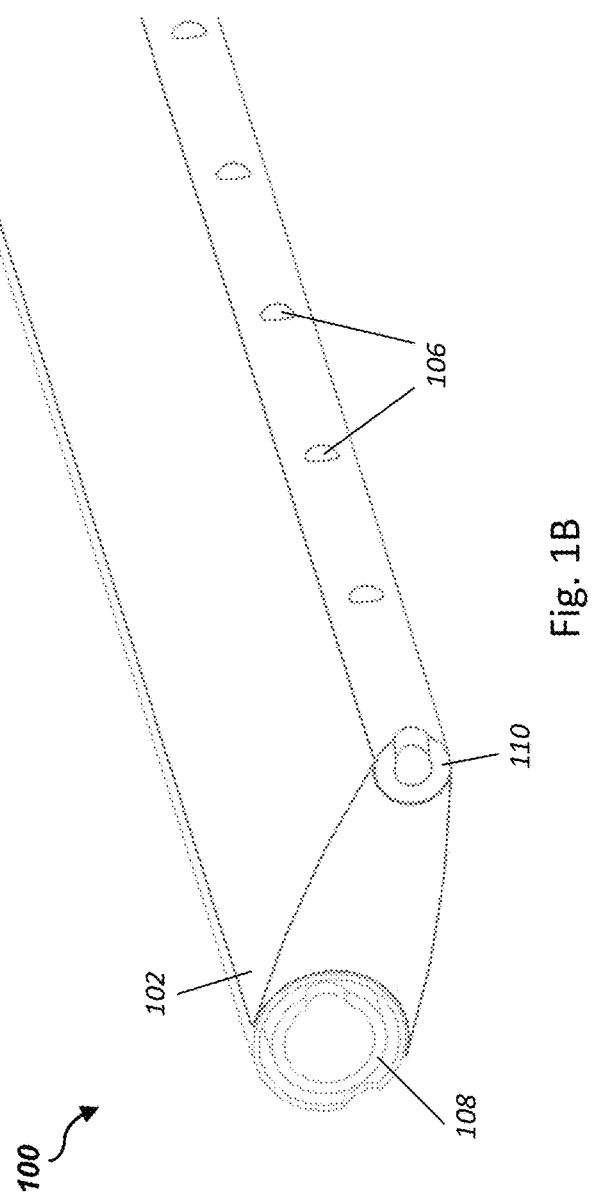

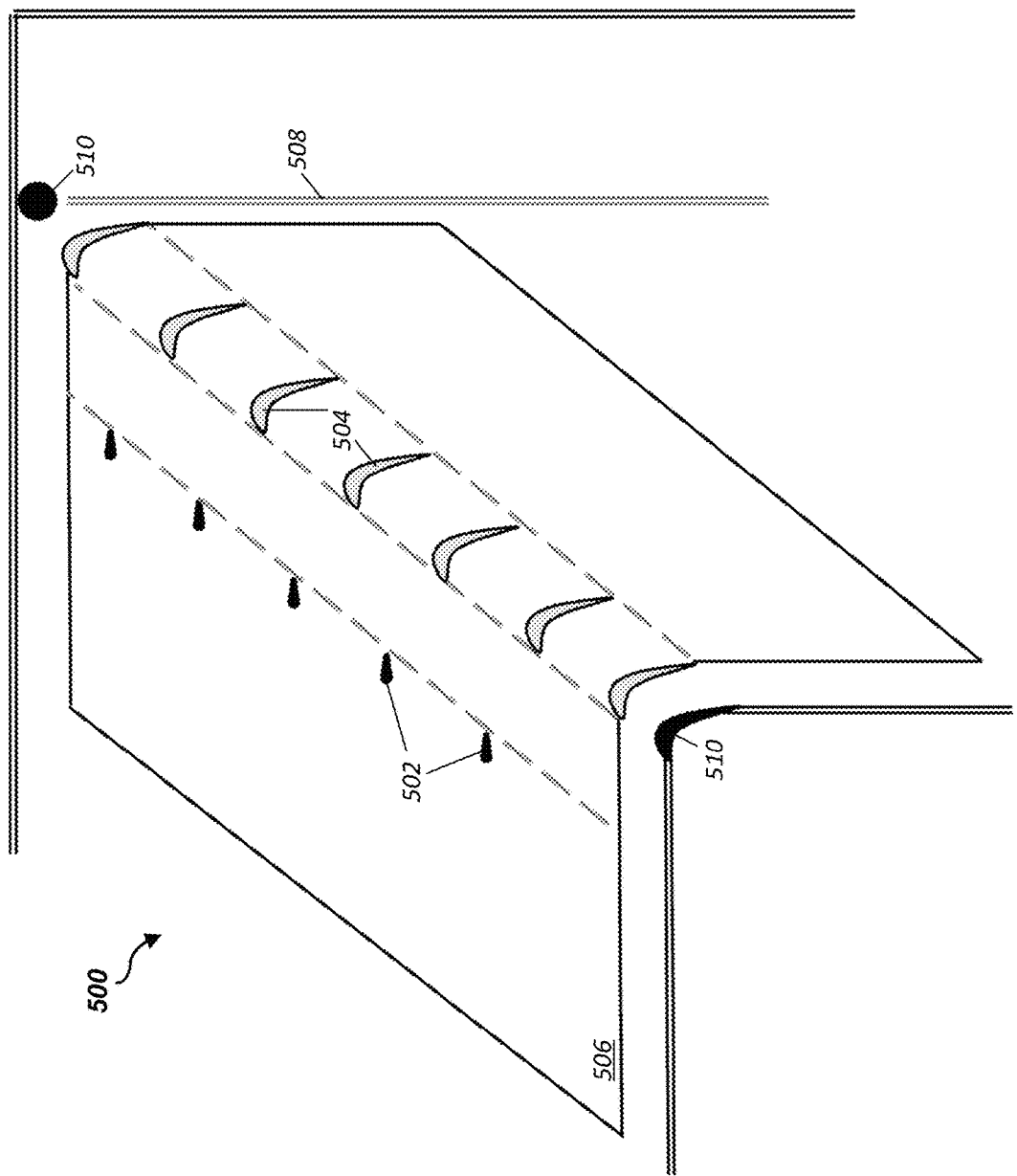

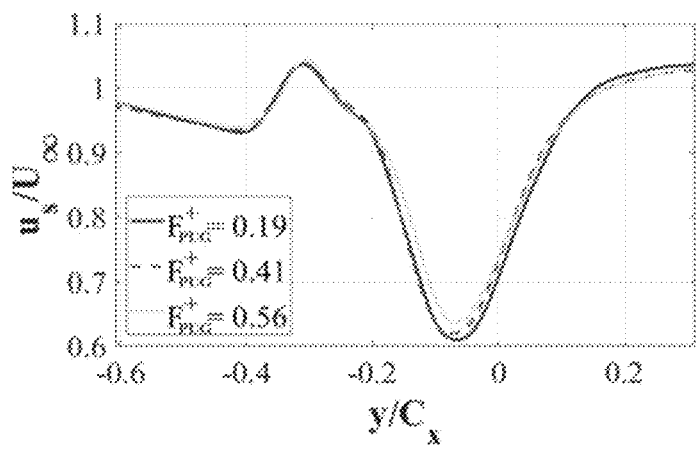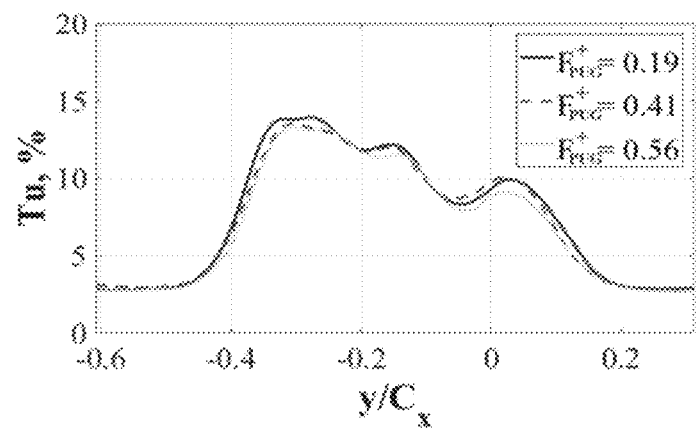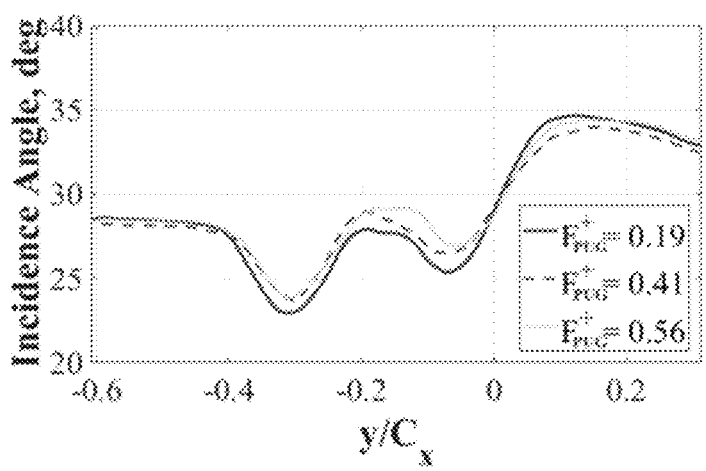
Fig. 6

PERIODIC UNSTEADINESS GENERATOR

CROSS-REFERENCE TO RELATED APPLICATIONS

This application claims the benefit of and priority to U.S. Provisional Application Ser. No. 62/928,073, entitled "Periodic Unsteadiness Generator," filed on 30 Oct. 2019, the entirety of which is incorporated by reference.

STATEMENT OF GOVERNMENT INTEREST

The invention described herein may be manufactured and used by or for the Government of the United States for all governmental purposes without the payment of any royalty.

BACKGROUND AND BRIEF DESCRIPTION

There are many sources of flow unsteadiness in a turbomachinery environment. One form which has a strong effect on the flow is produced by the passing of one blade row through the wake shed from an upstream row. This type of unsteadiness is periodic and dependent on the flow speed relative to the rotational speed of the rotating device. The periodic disturbance is often characterized relative to the frame of interest by parameters such as reduced frequency, velocity deficit, turbulence intensity, and incidence angle. Several devices have been described in literature which have been used to simulate the periodic flow disturbances produced by upstream wakes in linear or annular cascade wind tunnel test sections. Most of the devices consist of cylindrical rods attached to a chain or large wheel that enables the rods to be traversed upstream of a blade row at high-speed. The rod passing produces a series of wake-like disturbances. The benefit of the moving rod type of wake generator is the production of a continuous yet periodic disturbance that propagates through a passage in a similar manner to actual wakes. This is especially true when assessing the flow through the mid-span region of a passage. The downside of such a device is the intrusive nature of the support structure (i.e. chains, sprockets, etc.) including slots or gaps to allow the high speed motion of the rods. The device described here is an alternative to a moving bar wake generator. It is comprised of fixed bars positioned upstream of the blade and used to produce periodic disturbances that travel through the passages of interest. The emphasis of studies when using such a device is on fundamental flow studies to learn something about the dynamic response of the passage three-dimensional flow structures to large scale periodic forcing similar to those in turbomachinery.

Stationary pneumatic devices are used to generate velocity deficits in an unsteady manner. By pulsing compressed air upstream through jets from the device, periodic disturbances propagate downstream and can be used to study the effect of the disturbance on a particular region of the passage flow. This periodic forcing is most comparable to the periodic unsteadiness in turbomachinery due to upstream wake passing.

A series of tests, performed using one implementation of devices and methods described herein, is reported in "Turbine Secondary Flow Response to Upstream Periodic Unsteadiness" by Fletcher et al., AIAA Scitech 2020 Forum, 5 Jan. 2020 (AIAA2020-0834), which is hereby incorporated by reference in its entirety.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES can be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

FIGS. 1A and 1B are perspective views of cross sections of a periodic unsteadiness generator in accordance with an aspect of the present disclosure;

FIG. 5 is a plan view of a low velocity wind tunnel having multiple periodic unsteadiness generators installed therein; and FIG. 6 shows charts illustrating the results of tests performed using multiple periodic unsteadiness generators in a wind tunnel.

DESCRIPTION OF THE DISCLOSURE

Figure 2:
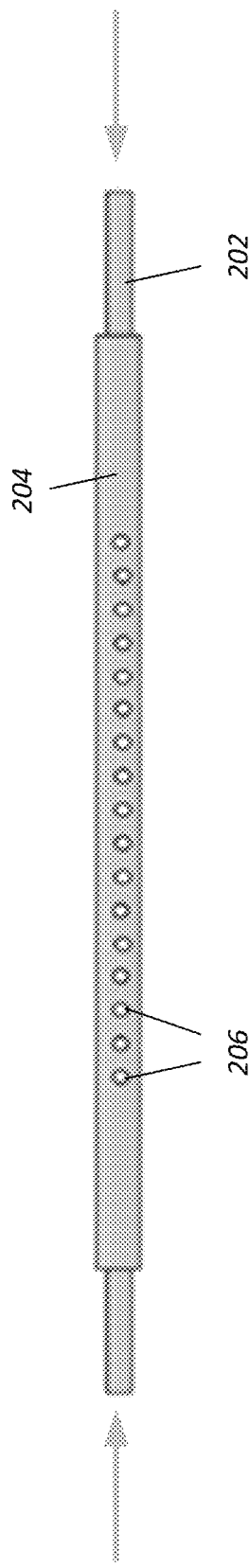
FIG. 2 is a plan view of a tube-in-tube configuration for leading edge jets in accordance with an aspect of the present generator.

The description set forth below in connection with the appended drawings is intended as a description of exemplary embodiments of the disclosure and is not intended to represent the only forms in which the present disclosure can be constructed and/or utilized. The description sets forth the functions and the sequence of blocks for constructing and operating the disclosure in connection with the illustrated embodiments. It is to be understood, however, that the same or equivalent functions and sequences can be accomplished by different embodiments that are also intended to be encompassed within the spirit and scope of this disclosure.

Generally described, the systems and methods herein are directed to the simulation of periodic unsteadiness conditions in an air stream.

FIGS. 1A and 1B show a periodic unsteadiness generator device 100. The device 100 comprises a long tube 102 having a teardrop cross-section. A first row of jets 104 are located along the leading edge, and a second row of jets 106 along the trailing edge of the device 100. The leading jets 104 are fed from a tubes 108 located along the length of the leading edge; the trailing jets 106 are fed from a separate tube 110 along the trailing edge.

The device 100 as shown can be produced by means of an additive manufacturing process wherein the leading tube 108 and the trailing tube 110 are connected to form the body with the streamlined teardrop cross-section, or by conventional manufacturing means. Embedded along the leading edge is a tube-in-tube configuration from which compressed air is pulsed upstream at an incidence angle relative to the freestream. The leading jets 104 pulse this air at period intervals in accordance with parameters further described herein to create a region with reduced velocity and elevated turbulence, thus simulating periodic unsteadiness in the air stream.

FIG. 2 illustrates an implementation of the tube-in-tube configuration for the leading edge. Compressed air is fed into both ends of the interior tube 202 and actuated using high-speed solenoid valves (not shown)—one on each end. Apertures from the interior tube (see FIG. 3 described below) lead into the exterior tube 204, so the air is expelled from the exterior jets 206. The tube-in-tube configuration along the leading edge improves uniformity of the characteristics of the air that emerges from the exterior jets 206.

Figure 3:
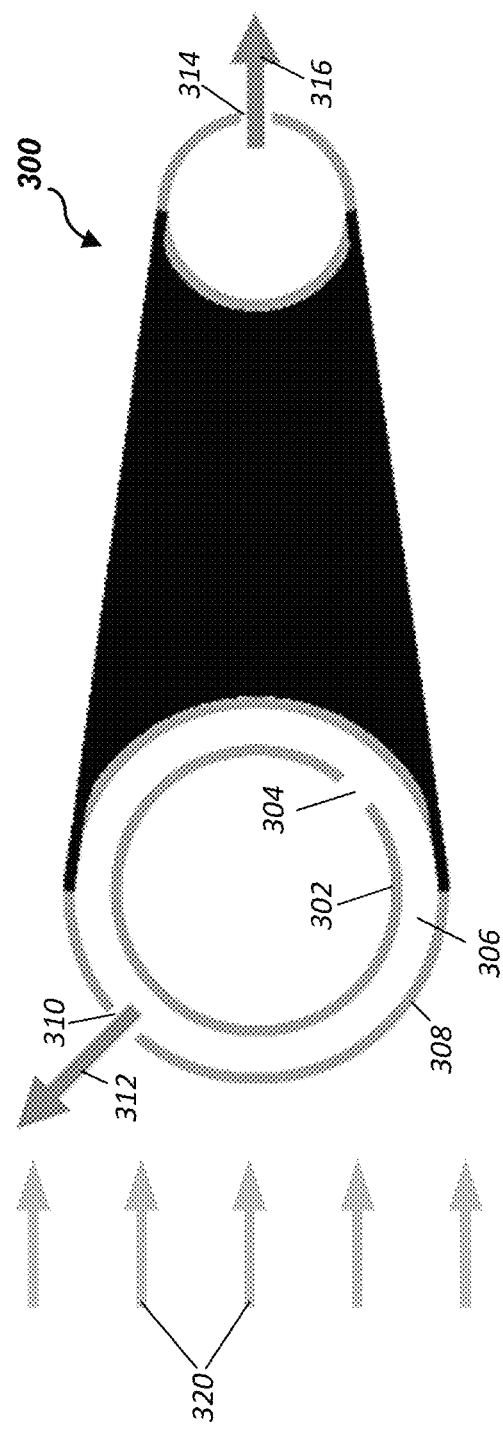
FIG. 3 is a diagrammatic cross-section view of air flow through a periodic unsteadiness generator in accordance with an aspect of the present disclosure.

The cross-section of FIG. 3 shows directions of expelled air for one implementation of the device 300. On the leading edge, air from the interior tube 302 leaves through internal aperture 304. A narrow cavity 306 between the interior tube 302 and external tube 308 adds resistance to provide a more uniform distribution of air. The arrows 320 show the direction of the exterior airstream prior to reaching the device 300. As arrow 312 shows, the leading edge external jets 310 expel air at an angle to, and against, the exterior airflow. At the trailing edge, jets 314 emit a steady stream of air in the same direction as the airflow to fill in the profile wake, as shown by arrow 316.

To optimize the characteristics of the periodic unsteadiness added to the airflow, different characteristics of the device may be varied. In some implementations, adjustments may be made to the following parameter: trailing edge (TE) jet supply pressure, leading edge (LE) pulsed jet supply pressure, frequency and duty cycle of the LE jet supply, and incidence angle of the pulsed jet relative to the incoming flow velocity. A discussion follows of certain tested values, and the characteristics of the resultant air flow; the examples disclosed herein are not limiting on the invention, but will inform one of ordinary skill as to ways in which the parameters affect the result.

Figure 4:
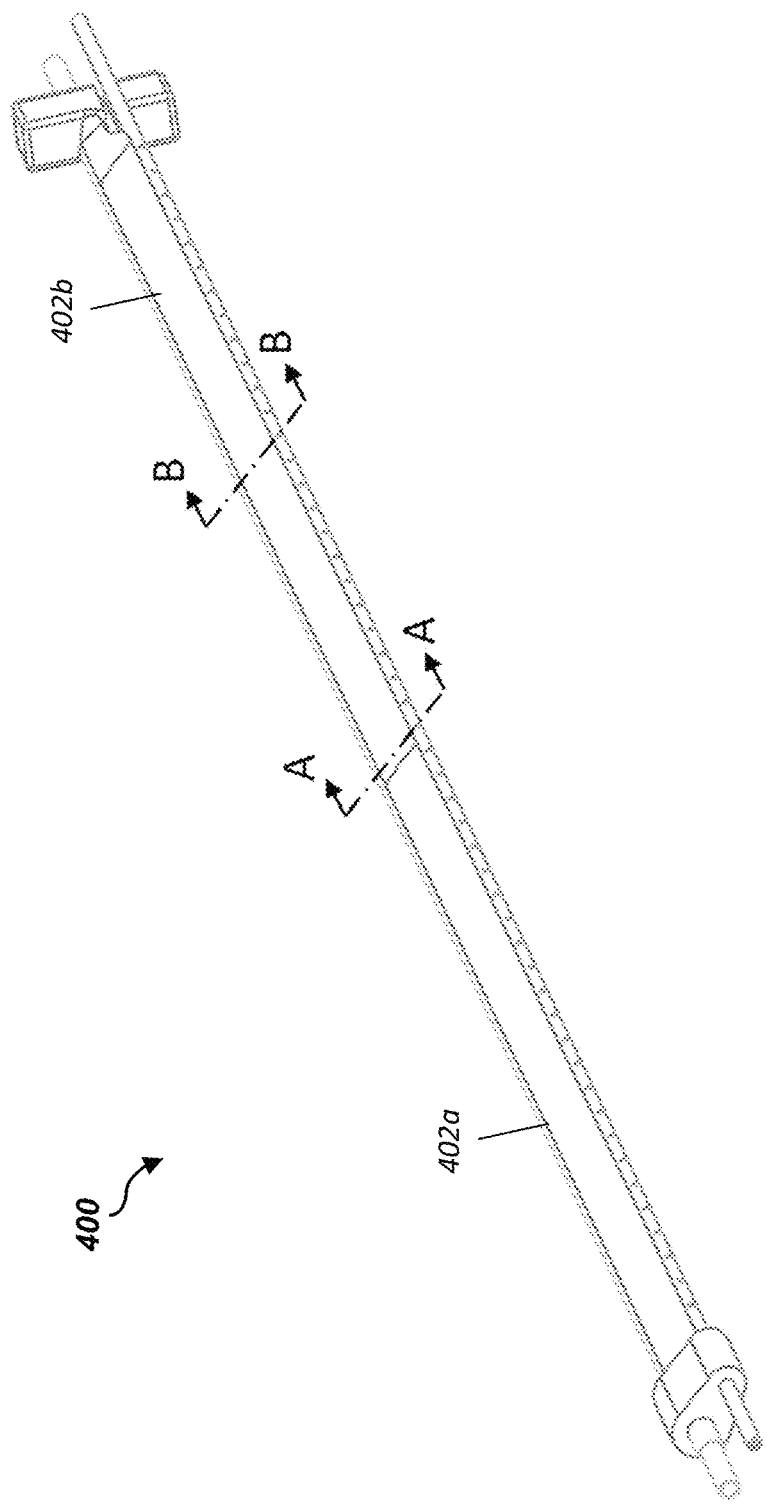
FIG. 4 is perspective view of a periodic unsteadiness generator in accordance with an aspect of the present disclosure.
Figure 4B:
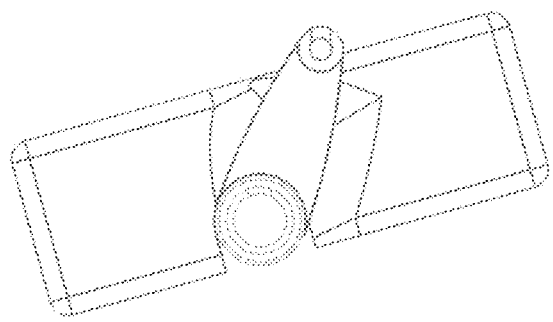
FIG. 4B is a cross-section view through lines B-B from FIG. 4.
Figure 4A:
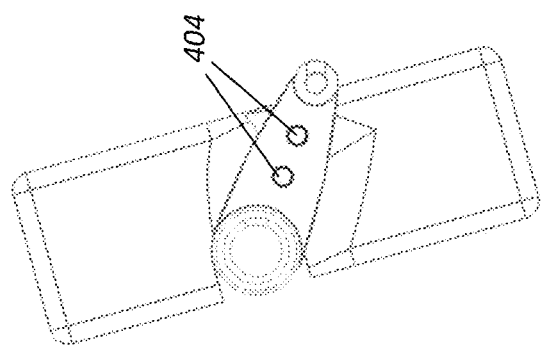
FIG. 4A is a cross-section view through lines A-A from FIG. 4.

As shown in FIGS. 4, 4A, and 4B, a developmental version 400 was fabricated to fit across a 12 inch wide developmental wind tunnel test section. The additive manufactured plastic body was used to create a streamlined cross-section structure. The body was printed in two different pieces 402a and 402b and fastened together with two steel rods 404 as shown. Other than the length, and the mounting attachments, the dimensions of the device were the same as the longer version described in the following section.

In the earliest tests a Parker Series 9 2-way normally-closed solenoid valve with 0.116 inch diameter orifice size was used to pulse the compressed air supply to each end of the leading edge tube. In latter developmental tests a single Fest MHJ10-S-2,5-QS-6-HF solenoid valve controlled the pneumatic actuation to each end of the 12 inch span device.

The device 400 was used in a developmental tunnel with an incoming flow velocity of 5.1 m/s. following range of parameters were used: TE jet supply pressure 5 psi, LE jet supply pressure 20-60 psi, solenoid valve input duty cycle 5-25%, LE pulsing frequency 10-30 Hz, pulsed jet incidence angle 20°-70°.

Longer versions of the device were fabricated for use in a linear cascade wind tunnel. The length of the device was sized so that it extended across the full span of the blade passage under study—from the splitter plate to the top of the wind tunnel—25 inches. The overall length of the tubes was 27 inches as it protruded from the passage so that it could be fastened in place and so that the metal leading and trailing edge tubes could be connected to the pneumatic feed lines. The cross-sectional profile of the 25 inch span version was the same as used in the 12 inch span version except at the end which extended through the top endwall of the wind tunnel. The top end was tapered so that it could fit through a slot already located in the top wall of the wind tunnel test section.

For this version of the device, the dimensions of the device are listed in the following table. In addition to each measurement in inches, the ratio between that measurement and the turbine blade axial chord (6.0 inches) is also listed:

TABLE 1

| Periodic Unstable Generator Parameters | | |
|---|---|---|
| Parameter | Dimension (in) | Dimension/blade axial chord |
| Axial length | 0.714 | 0.119 |
| Span Length Inside in Tunnel | 25 | 4.17 |
| Overall length | 27 | 4.5 |
| LE outside tube outer diameter | 0.25 | 0.042 |
| LE outside tube inner diameter | 0.228 | 0.038 |
| LE inside tube outer diameter | 0.188 | 0.031 |
| LE inside tube inner diameter | 0.15 | 0.025 |
| TE tube outer diameter | 0.125 | 0.021 |
| TE tube inner diameter | 0.063 | 0.010 |
| LE Jet hole diameter | 0.065 | 0.011 |
| TE Jet hole diameter | 0.065 | 0.011 |
| LE Jet hole spacing | 0.5 | 0.083 |
| TE Jet hole spacing | 0.5 | 0.083 |

Compressed air was fed into both ends of the leading edge tube. A high-speed solenoid valve, Festo MHJ10-S-2,5-QS-6-HF was used to pulse the compressed air supply into each end of the leading edge tube. The valve pulsing was synchronized so that all valves pulsed at the same time. The leading edge jets expelled at a 70 degree angle relative to the incoming airstream.

The device was installed upstream of a low speed linear cascade of high-lift low pressure turbine blades, as shown from the top down as FIG. 5. Here, the devices 502 are placed in the wind tunnel 500 upstream of the turbines blades 504. The configuration further includes a splatter plate 506, tailboard 508, and endflow adjusters 510. Implementation of the devices in the wind tunnel involved fabricating several large-scale versions, designing and building a pneumatic system to plumb all the devices, constructing the electrical configuration to actuate all the solenoid valves, and making necessary wind tunnel modifications. Tunnel periodicity was checked using downstream total pressure measurements for two blade pitches. The disturbances generated by the devices were characterized by measuring different wake parameters such as velocity deficit, wake width, turbulence intensity, and momentum deficit. In addition to the sensitivity of the pulsed disturbance characteristics to the compressed air supply pressure and pulsing parameters found in the wind tunnel. The pitchwise location had a strong effect on the disturbance as well.

A goal of the upstream characterization was to position the devices in a pitchwise location so that the disturbance would convect downstream and periodically perturb the LE region of the blades. The devices were spaced with a distance of one blade pitch or 7.32 inches between one another, and 4.5 inches upstream from the leading edge of the blade set. In this manner they are used to study the effect of periodic disturbances on the unsteady three-dimensional flow structures in the endwall region of the passages. The vortical flows along the endwall were studied under the influence of periodic disturbances at various reduced frequencies. The device was operated with LE supply pressures between 33-55 psi, with pulsing frequencies between 5-15 Hz and input DC of 15-35%, with a constant TE supply pressure of 17 psi.

As noted above, other configurations have been tested using various parameters. As a further example, devices were placed in a wind tunnel with a seven blade low pressure turbine linear cascade, having the following conditions:

TABLE 2

Low Speed Wind Tunnel Conditions

| Parameter | Value |
| --- | --- |
| Axial chord length | 15.24 cm |
| Ratio: (pitch)/(axial chord) | 1.221 |
| Ratio: (span)/(axial chord) | 4.17 |
| Inlet flow angle | 35° |
| Mean profile exit angle | −58° |
| Freestream turbulence density | 3.0% |
| Zweifel Coefficient | 1.59 |
| Reynolds Number | 50,000 |

The devices themselves had characteristics similar to that shown in Table 1, but with a spacing of 1.221 times the chord distance and a leading edge jet blowing angle of 250°. Certain particular actuation frequencies were shown to result in similar airflow parameters over a measured range of axial locations, as shown in FIG. 6. Here, three particular normalized frequencies of actuation F+ for the devices showed similar profiles (each with a trailing edge plenum pressure of 17.0 psi): F+=0.19 (5 Hz, LE 33.0 psi, duty cycle 15%), F+=0.41 (11 Hz, LE 45.0 psi, duty cycle 25%) and F+=0.56 (15 Hz, LE 55.0 psi, duty cycle 35%). The streamwise velocity, turbulence intensity, and incidence angle are each shown for these three normalized frequencies of actuation, over a range of axial distances.

When used as described, these generators have the potential to provide a more consistent and less costly method of simulating periodic unsteadiness, and may be adapted to provide a broad range of flow conditions without having to replace or alter moving components.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A periodic unsteadiness generator, comprising: a solid body having a longitudinal axis;

a leading edge comprising a plurality of leading edge jets connected to a common leading edge chamber within the body; and a trailing edge opposite the leading edge comprising a plurality of trailing edge jets connected to a trailing edge chamber within the body;

wherein the leading edge chamber and the trailing edge chamber are each configured to receive air and then expel the air through the leading edge and trailing edge jets, respectively and wherein the leading edge further includes a leading edge inlet configured to receive a pulsed flow of air into the leading edge chamber; and the trailing edge includes a trailing edge inlet, separate from the leading edge inlet, configured to receive a sustained flow of air into the trailing edge chamber; and an interior chamber disposed concentrically within the leading edge chamber, the interior chamber having a plurality of interior apertures from which air moves into the leading edge chamber to be expelled from the leading edge jets; wherein air flows from the leading edge inlet into the interior chamber, and then into the leading edge chamber.

2. The periodic unsteadiness generator of claim 1, wherein the leading edge jets are positioned so that, when the generator's leading edge is placed to face the direction of an airstream, air is expelled from the leading edge jets at a non-parallel angle relative to the airstream.

* * * * *